Aug. 4, 1925.  1,548,339

G. W. SMUTZ

TANK FILLING MECHANISM

Filed June 24, 1922   2 Sheets-Sheet 1

INVENTOR
George W. Smutz
BY John A. Naismith
ATTORNEY

Aug. 4, 1925.

G. W. SMUTZ 1,548,339

TANK FILLING MECHANISM

Filed June 24, 1922  2 Sheets-Sheet 2

INVENTOR
George W. Smutz
BY John A. Naismith
ATTORNEY

Patented Aug. 4, 1925.

1,548,339

UNITED STATES PATENT OFFICE.

GEORGE W. SMUTZ, OF SAN JOSE, CALIFORNIA.

TANK-FILLING MECHANISM.

Application filed June 24, 1922. Serial No. 570,704.

*To all whom it may concern:*

Be it known that I, GEORGE W. SMUTZ, a citizen of the United States, and resident of San Jose, in the county of Santa Clara and State of California, have invented certain new and useful Improvements in Tank-Filling Mechanism, of which the following is a specification.

It is the object of my invention to provide a means for automatically depositing a predetermined quantity of liquid from a supply tank in each of a plurality of tanks revolved as a unit in a vertical plane and about a common center.

In the drawing:—

Figure 1:
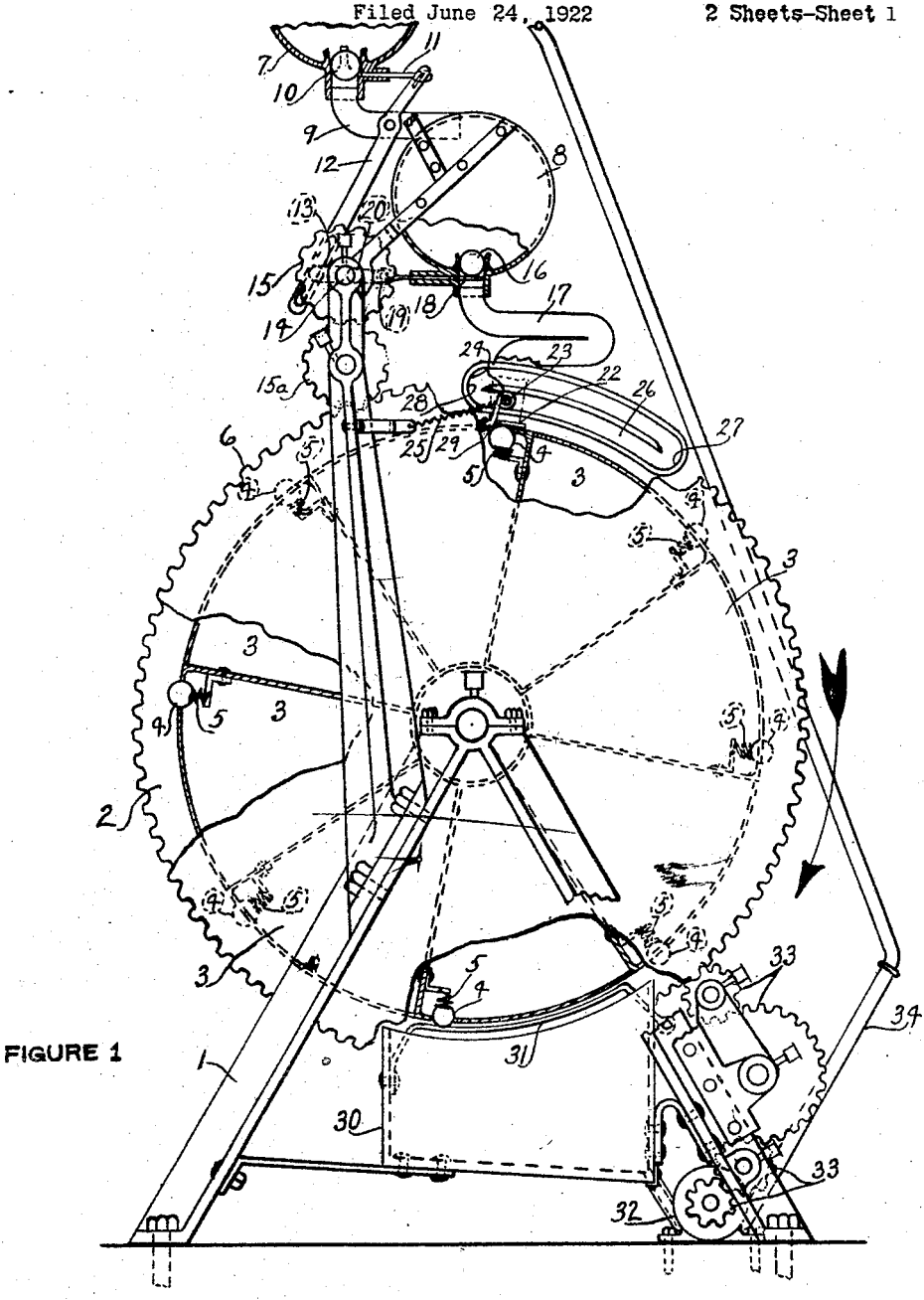
Figure 1 is a side elevation of my improved device, parts being broken away.
Figure 2:
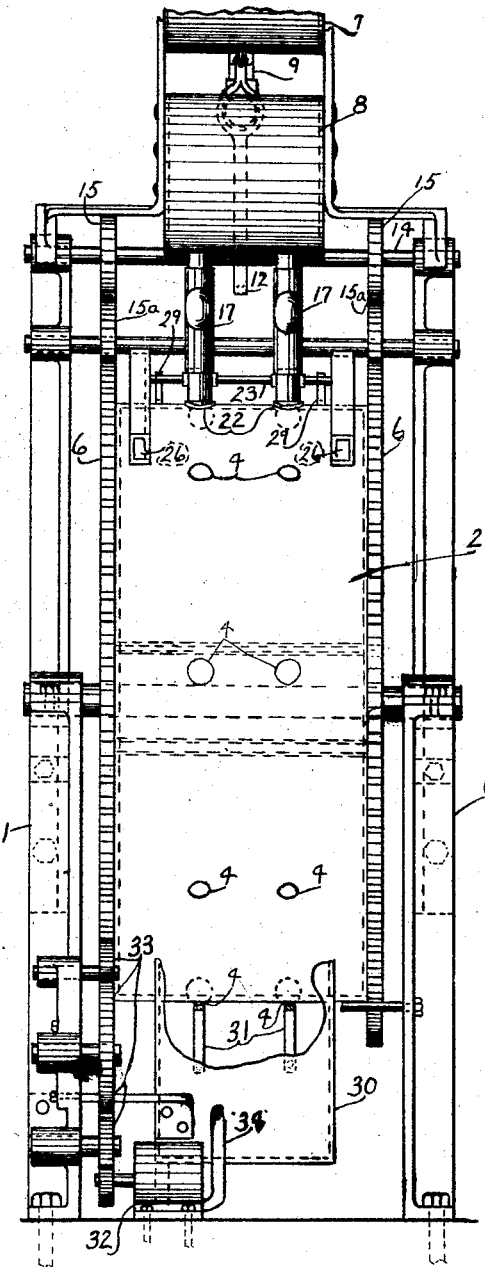
Figure 2 is a front view of the same, parts being broken away.
Figure 3:
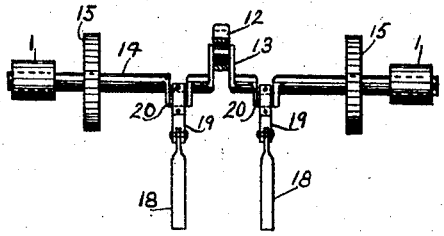
Figure 3 is a plan view of the valve controlling mechanism, parts being broken away.
Figure 4:
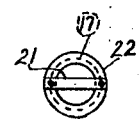
Figure 4 is an end view of one of the nozzles shown in Figure 2.

Referring more particularly to the drawing, 1 indicates a supporting frame work upon which is mounted a revolving shaft carrying a drum 2. The interior of drum 2 is divided to form a number of tanks 3, each tank 3 having a ball valve 4 fitted in its outer wall and normally held in place by a spring 5, a small portion of the ball extending beyond the periphery of drum 2 as shown. Drum 2 also carries a gear 6.

Supported by frame 1 above drum 2 are tanks 7 and 8, tank 7 being a large supply tank for several smaller tanks 8 and discharging into tank 8 through conduit 9, only one of the smaller tanks being shown. The flow of liquid from tank 7 to tank 8 is controlled by a ball valve 10 operated by a sliding pin 11 and crank 12 operating on a crank 13 on shaft 14 mounted on frame 1 and driven by gears 15—15ª, the latter meshing with gear 6. This arrangement is such that pin 11 is alternately thrust forward to engage ball 10 and force the same upwardly to open conduit 9 and then withdrawn to permit ball 10 to close the conduit.

Tank 8 holds substantially the same amount of liquid as a tank 3 in drum 2 and is fitted with a ball valve 16 discharging into conduit 17 and operated by a sliding pin 18 connected by a link 19 to a crank 20 on shaft 14 but extending in an opposite direction to crank 13 so that when ball valve 10 is opened ball valve 16 is closed and vice versa.

Since drum 2 is rotating all of the time while liquid is being discharged from tank 8 to a tank 3 it is necessary to provide a mechanism whereby the discharge end of conduit 17 will be held in contact with the valve in a tank 3 during the process of filling.

To secure this result I provide a conduit 17 made of flexible material and having a bar 21 across its nozzle 22 sufficiently strong to press the ball inwardly against the outward pressure of spring 5. To nozzle 22 is secured a cross bar 23 carrying a cam 24 on each end and connected to the frame 1 of the machine by springs 25—25. Each cam 24 slides forwardly in a groove 26 until it meets cam surface 27 where it is forced upwardly and drawn back to its former position by springs 25. When spring 25 draws it back to its starting position the cam surface 28 directs it downwardly and upstanding pins 29 on drum 2 engage the bar 23 and force it forwardly, again forcing cams 24 into groove 26 and pressing nozzle 22 down upon valve 4 and opening the same.

Beneath drum 3 is shown a receiving tank 30 having a bar 31 arranged thereover in such a manner as to engage balls 4 as they pass over the tank and force them inwardly against the pressure of spring 5 thereby permitting the liquid in the tanks to be discharged into receiver 30.

The liquid discharged into receiver 30 is pumped back to tank in any suitable manner.

It may now be seen from the above description that as each tank 3 in drum 2 passes its highest point of travel it is filled with liquid, and the liquid is discharged therefrom at the lowest point of its travel, the empty tank 3 being readily carried to the top again to be refilled by the excess of weight on the other side of the drum occasioned by the tanks on that side being filled with liquid. The movement of the drum may be steadied by any suitable governor, but since this is not an essential part of the invention no specific form is shown.

The duplicate parts in the disclosure are indicated by figures followed by an appropriate letter.

It is to be understood, of course, that while I have herein shown and described one particular embodiment of my invention changes in form, construction, and method of operation may be made within the scope of the appended claim.

I claim:—

A device of the character described comprising a plurality of tanks revoluble as a unit in a vertical plane about a common center, a port in the outer wall of each tank, a valve mounted to normally close said port, a valve controlled liquid supply tank arranged above said revoluble tanks, a flexible hose connected thereto, a nozzle on said hose adapted to successively engage and open the ports in the several revolving tanks to fill the same with liquid, a cross bar carried by said nozzle having a cam mounted on each end thereof, a pair of parallelly arranged members mounted in fixed relation to said drum adjacent to the periphery thereof and in opposed relation to each other and having grooves formed therein to engage said cams, said grooves being formed to maintain said nozzle in engagement with one of said ports for a predetermined period of time, and to remove said nozzle from said engagement at the expiration of said predetermined period of time, and resilient means for returning said nozzle after said removal.

GEORGE W. SMUTZ.